United States Patent
Wang et al.

(10) Patent No.: US 8,511,154 B2
(45) Date of Patent: Aug. 20, 2013

(54) METHOD AND APPARATUS TO DETERMINE A CYLINDER AIR CHARGE FOR AN INTERNAL COMBUSTION ENGINE

(75) Inventors: Yue-Yun Wang, Troy, MI (US); Ibrahim Haskara, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 206 days.

(21) Appl. No.: 13/109,062

(22) Filed: May 17, 2011

(65) Prior Publication Data
US 2012/0291534 A1    Nov. 22, 2012

(51) Int. Cl.
*G01M 15/04*    (2006.01)

(52) U.S. Cl.
USPC .................................. 73/114.74; 73/114.32

(58) Field of Classification Search
USPC .............. 73/114.32, 114.33, 114.34, 114.37, 73/114.74
See application file for complete search history.

(56) References Cited

U.S. PATENT DOCUMENTS

| | | | |
|---|---|---|---|
| 5,474,051 A * | 12/1995 | Matsumoto et al. | 123/568.16 |
| 5,540,091 A * | 7/1996 | Nakagawa | 73/114.74 |
| 6,636,796 B2 * | 10/2003 | Kolmanovsky et al. | 701/104 |
| 6,802,302 B1 * | 10/2004 | Li et al. | 123/568.16 |
| 6,944,530 B2 * | 9/2005 | Russell et al. | 701/104 |
| 7,181,335 B2 * | 2/2007 | Barba et al. | 701/108 |
| 7,319,929 B1 | 1/2008 | Davis et al. | |
| 7,448,369 B2 | 11/2008 | Robinson et al. | |
| 7,739,027 B2 * | 6/2010 | Kang et al. | 701/108 |
| 2002/0029623 A1 * | 3/2002 | Wild et al. | 73/116 |
| 2002/0133286 A1 | 9/2002 | Kolmanovsky et al. | |
| 2006/0161332 A1 * | 7/2006 | Barba et al. | 701/108 |
| 2009/0049897 A1 * | 2/2009 | Olin et al. | 73/114.32 |
| 2011/0174066 A1 * | 7/2011 | Martin et al. | 73/114.74 |

OTHER PUBLICATIONS

U.S. Appl. No. 13/109,040, Wang, et al.

* cited by examiner

*Primary Examiner* — Eric S McCall

(57) ABSTRACT

A method for estimating a cylinder air charge for an internal combustion engine includes determining a first volumetric efficiency corresponding to engine operation with an open exhaust gas recirculation valve, determining a second volumetric efficiency corresponding to engine operation with a closed exhaust gas recirculation valve, determining a cylinder air charge using a selected one of the first and second volumetric efficiencies.

6 Claims, 4 Drawing Sheets

METHOD AND APPARATUS TO DETERMINE A CYLINDER AIR CHARGE FOR AN INTERNAL COMBUSTION ENGINE

TECHNICAL FIELD

This disclosure is related to internal combustion engines.

BACKGROUND

The statements in this section merely provide background information related to the present disclosure. Accordingly, such statements are not intended to constitute an admission of prior art.

Known internal combustion engine systems combust mixtures of air and fuel in cylinders to drive pistons, thus generating torque. Engine control systems control engine operation to generate engine power that is responsive to an operator torque request while accounting for fuel economy and emissions requirements. Known engine control systems monitor control and operating parameters to estimate or otherwise determine an engine mass airflow and control engine fueling.

Engine fueling is controlled by determining the engine mass airflow, determining a cylinder air charge for an individual cylinder based thereon, and calculating a preferred mass of fuel that corresponds to the cylinder air charge to meet the operator torque request in view of fuel economy and emissions requirements.

SUMMARY

A method for estimating a cylinder air charge for an internal combustion engine includes determining a first volumetric efficiency corresponding to engine operation with an open exhaust gas recirculation valve, determining a second volumetric efficiency corresponding to engine operation with a closed exhaust gas recirculation valve, determining a cylinder air charge using a selected one of the first and second volumetric efficiencies.

BRIEF DESCRIPTION OF THE DRAWINGS

One or more embodiments will now be described, by way of example, with reference to the accompanying drawings, in which.

DETAILED DESCRIPTION

Figure 1:
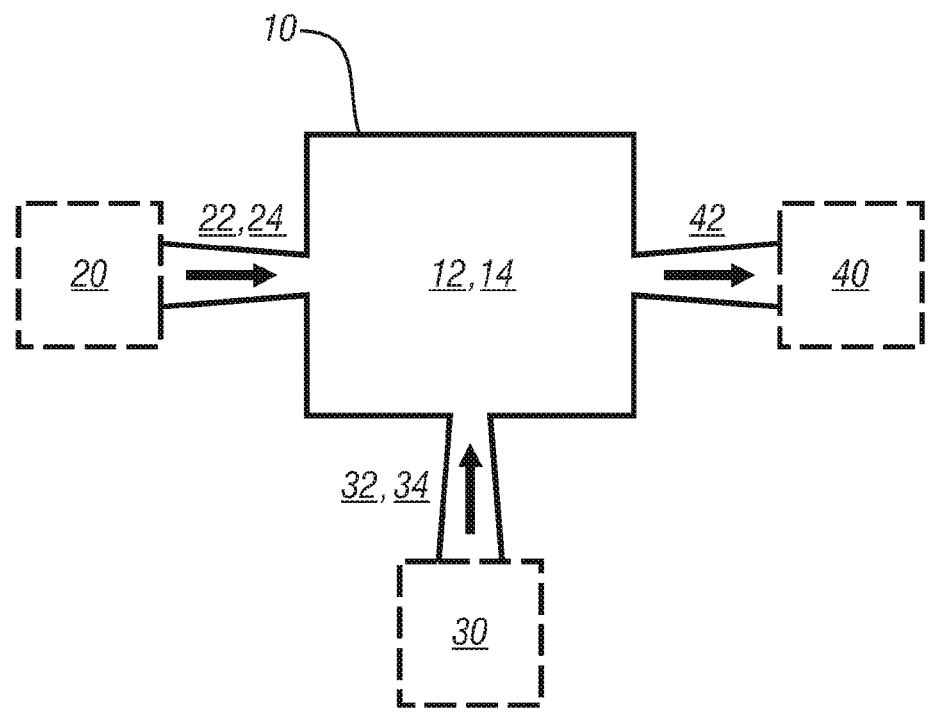
FIG. 1 schematically depicts an intake manifold for an internal combustion engine including an intake system and an exhaust gas recirculation (EGR) system in accordance with the present disclosure.

Referring now to the drawings, wherein the showings are for the purpose of illustrating certain exemplary embodiments only and not for the purpose of limiting the same, FIG. 1 schematically depicts an intake manifold 10 for an internal combustion engine, including an intake system 20 and an exhaust gas recirculation (EGR) system 30. Input and operating parameters include an intake air flow 22, an intake air temperature 24, an EGR flowrate 32, and an EGR temperature 34. As is appreciated, the input and operating parameters may be directly monitored using on-board sensors or may be otherwise determined. For example, engine speed, throttle position, and temperatures and pressures (including for intake and exhaust manifolds and ambient surroundings) may be directly sensed via hardware well known in the art. Other parameters for the engine may be readily determined through various relationships of such sensed quantities. The intake system 20 may be naturally aspirated or may employ an air compressor device such as a turbocharger or a supercharger and an accompanying intercooler for cooling intake air temperature upstream of the intake manifold 10. Parameters associated with the intake air charge in the intake manifold 10 include manifold air pressure 12 and an intake air charge temperature 14. The intake air and recirculated exhaust gas are channeled through the intake manifold 10 to one or a plurality of engine cylinders 40, and is characterized by a cylinder air charge flow 42. The exhaust gas recirculation (EGR) system 30 may be any suitable system configured to control external recirculation of exhaust gas from an exhaust system to the intake manifold 10.

Pressure dynamics in the intake manifold 10 may be represented by the following equation derived based upon system enthalpy as set forth in Eq. 1 below:

$$\dot{P}_i = \frac{\gamma R}{V_i} \cdot T_a \cdot W_a + \frac{\gamma R}{V_i} \cdot T_{egr} \cdot W_{egr} - \frac{\gamma R}{V_i} \cdot T_i \cdot W_e \qquad [1]$$

wherein
$P_i$ is the manifold air pressure 12,
$\dot{P}_i$ is the rate of change in the manifold air pressure 12,
$V_i$ is a displaced air volume of the intake manifold 10,
$T_a$ is the intake air temperature 24, including intake air temperature after an intercooler on systems so equipped,
$T_{egr}$ is the EGR temperature 34,
$W_a$ is intake air flow 22,
$W_{egr}$ is the EGR flowrate 32,
$T_i$ is the intake air charge temperature 14,
$W_e$ is a cylinder air charge flow,
R is an ideal gas constant, and
$\gamma$ is specific heat of the gas.

Eq. 1 may be reformed into an equation to estimate the cylinder air charge flow $W_c$ as follows:

$$W_e = \eta_v \frac{V_d}{120} \frac{P_i}{R \cdot T_i} \cdot N \qquad [2]$$

wherein
$V_d$ is volumetric displacement of the engine cylinders,
N is rotational speed of the engine, and
$\eta_v$ is a volumetric efficiency of the engine.

Determining the cylinder air charge flow $W_e$ on systems using either a turbocharger or a supercharger and associated intercooler may differ from a naturally aspirated engine in that intake air flowrate is boosted by the compressor and mass air temperature is reduced by intercooler, EGR flowrates may vary, intake manifold pressure may be boosted and may be greater than ambient air pressure, and exhaust pressure highly varies depending on operating states of the turbocharger or supercharger, such as position of a variable gate turbocharger, which may affect engine breathing dynamics. Therefore, volumetric efficiency may depend upon exhaust parameters including exhaust temperature and exhaust pressure. The exhaust temperature and exhaust pressure may be affected by factors associated with interactions of exhaust aftertreatment systems, as is appreciated by skilled practitioners.

The volumetric efficiency is used to quantify an efficiency of air induction. For a naturally aspirated engine operating at stoichiometry, volumetric efficiency may be modeled in relation to the engine speed and the intake manifold pressure. For other engine systems, e.g., a turbo-charged diesel operating with high-rates of recirculated exhaust gas through the EGR system, the volumetric efficiency may be modeled in relation to engine operating parameters including the engine speed N, the manifold air pressure $P_i$, the intake air charge temperature $T_i$, the exhaust manifold pressure $P_x$, and the exhaust manifold temperature $T_x$ represented as follows.

$$\eta_v = f(N, P_i, T_i, P_x, T_x) \quad [3]$$

Engine input parameters including intake air charge density $x_1$, the engine delta pressure $x_2$, and the engine speed $x_3$ may be developed for a volumetric efficiency model, using the engine operating parameters including the engine speed N, the intake manifold pressure $P_i$, the intake manifold temperature $T_i$, and the exhaust manifold pressure $P_j$, calculated as set forth below in Eqs. 4 through 6.

$$x_1 = \frac{P_i}{RT_i} \quad [4]$$

$$x_2 = \frac{P_x}{P_i} \quad [5]$$

$$x_3 = N \quad [6]$$

The engine input parameters including the intake air charge density $x_1$, the engine delta pressure $x_2$, and the engine speed $x_3$ have been found to dominate a volumetric efficiency model, thus permitting determining a range of volumetric efficiency values correlated to those engine input parameters.

Figure 2:
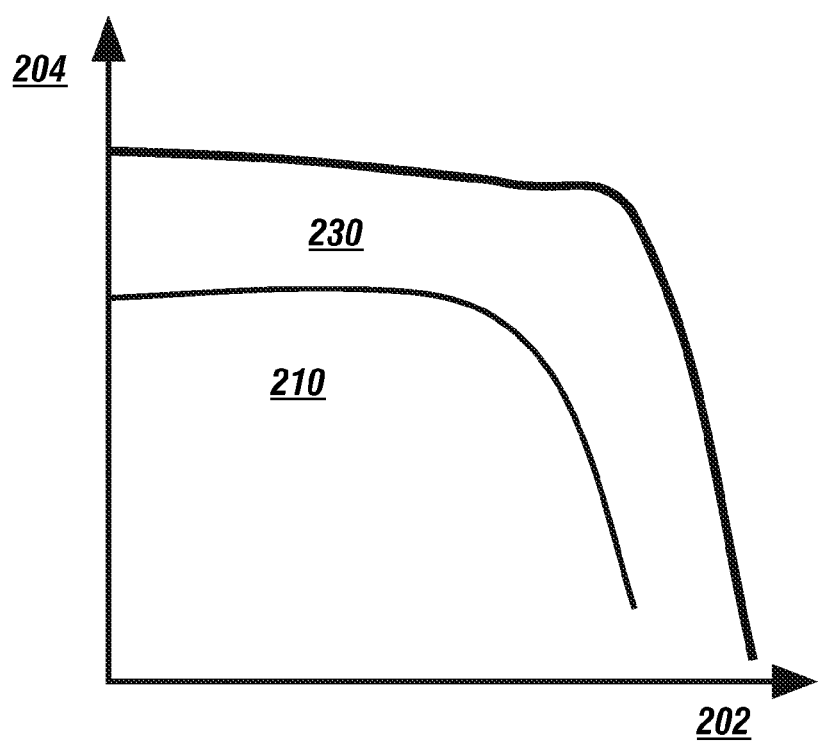
FIG. 2 graphically shows a structure for a multi-zone non-linear model to determine volumetric efficiency in accordance with the present disclosure.

FIG. 2 graphically shows a structure for a multi-zone non-linear model to determine volumetric efficiency. The non-linear model is partitioned into two zones that are distinguishable based upon engine speed 202 and load 204. The zones are distinguished based upon EGR flow and EGR valve open. Zone 1 210 is associated with an open EGR condition and corresponding EGR flow. Zone 2 230 is associated with a closed EGR valve condition with corresponding absence of EGR flow.

Engine operation in Zone 1 210 may be associated with engine operation in one set of known combustion modes, e.g., stoichiometry or lean operation at open-throttle conditions.

Engine operation in Zone 2 230 may be associated with engine operation in another set of known combustion and engine operating modes, e.g., high-speed and high-load conditions.

In Zones 1 and 2, 210 and 230 respectively, the volumetric efficiency model is decomposed into two stages, with each of the stages exhibiting a smooth surface. The smooth surface permits relatively smooth transitions for estimating volumetric efficiency, thus minimizing volumetric efficiency discontinuities and associated combustion instability. It is appreciated that either of Zones 1 210 and 2 and 230 may be further subdivided. By way of example Zone 1 210 may be subdivided based upon operation in a specific combustion mode such as a premixed charge compression-ignition combustion mode (PCCI), which is known to use EGR flow.

Figure 3:
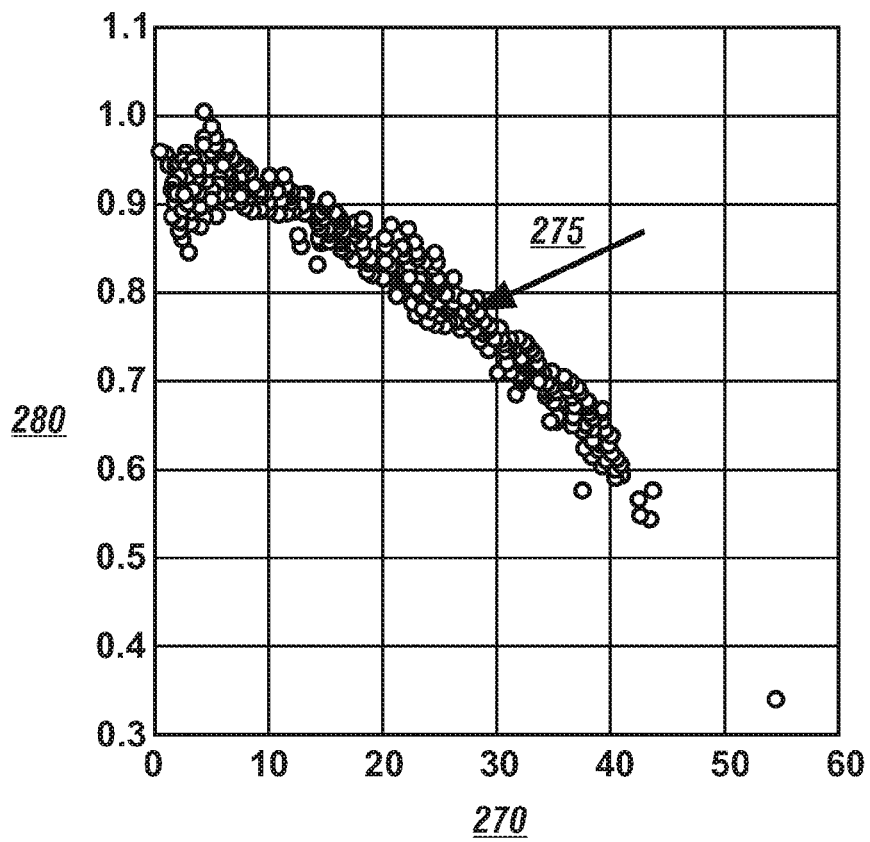
FIG. 3 graphically shows a relationship between volumetric efficiency and a proportion of an intake air charge that is recirculated exhaust gas for an exemplary engine in accordance with the present disclosure.

When operating in Zone 1 210 associated with the open EGR valve condition, volumetric efficiency may be determined as a function of EGR flow and engine speed $x_3$, which is expressed as follows:

$$\eta_v = f(\text{EGR \%}, x_3) \quad [7]$$

wherein $x_3$ is the engine speed and EGR % is a proportion of an intake air charge that is recirculated exhaust gas. This relationship is shown graphically with reference to FIG. 3, showing volumetric efficiency 280 on the y-axis and the proportion of the intake air charge that is recirculated exhaust gas EGR % 270, which is shown as the x-axis. The plotted data is volumetric efficiency data 275 associated with an exemplary engine system in relationship to the proportion of the intake air charge that is recirculated exhaust gas, i.e., EGR %.

The proportion of the intake air charge that is recirculated exhaust gas EGR % may be calculated as follows:

$$\text{EGR \%} = \frac{W_{egr}}{W_{egr} + W_{air}} \quad [8]$$

wherein $W_{egr}$ is EGR flowrate, and $W_{air}$ is the intake air flowrate.

The EGR flowrate $W_{egr}$ may be calculated as:

$$W_{egr} = A_{egr}(x_{egr}, PR) \frac{P_x}{\sqrt{RT_x}} \Psi(PR) \quad [9]$$

wherein $A_{egr}$ is an effective flow area of the EGR valve, $x_{egr}$ is a commanded valve position of the EGR valve, PR is a pressure ratio, i.e., the engine delta pressure $x_2$ calculated using Eq. 5, $P_x$ is the exhaust pressure, $T_x$ is the exhaust temperature, and $\Psi_{PR}$ is a correction term that corresponds to the pressure ratio PR.

The pressure ratio correction term $\Psi_{PR}$ is calculated as follows:

$$\Psi_{PR} = \begin{cases} \sqrt{\frac{2\gamma}{\gamma-1}(PR^{2/\gamma} - PR^{(\gamma+1)/\gamma})} & PR_c < PR < 1 \text{ (subsonic)} \\ \gamma^{1/2}\left(\frac{2}{\gamma+1}\right)^{\frac{\gamma+1}{2(\gamma-1)}} & PR \le PR_c \text{ (chocked)} \end{cases} \quad [10]$$

wherein $\gamma$ is the specific heat ratio, and $PR_c$ is a critical pressure ratio that is calculated as follows.

$$PR_c = \left(\frac{2}{\gamma+1}\right)^{\frac{\gamma}{\gamma-1}} \quad [11]$$

Figure 5:
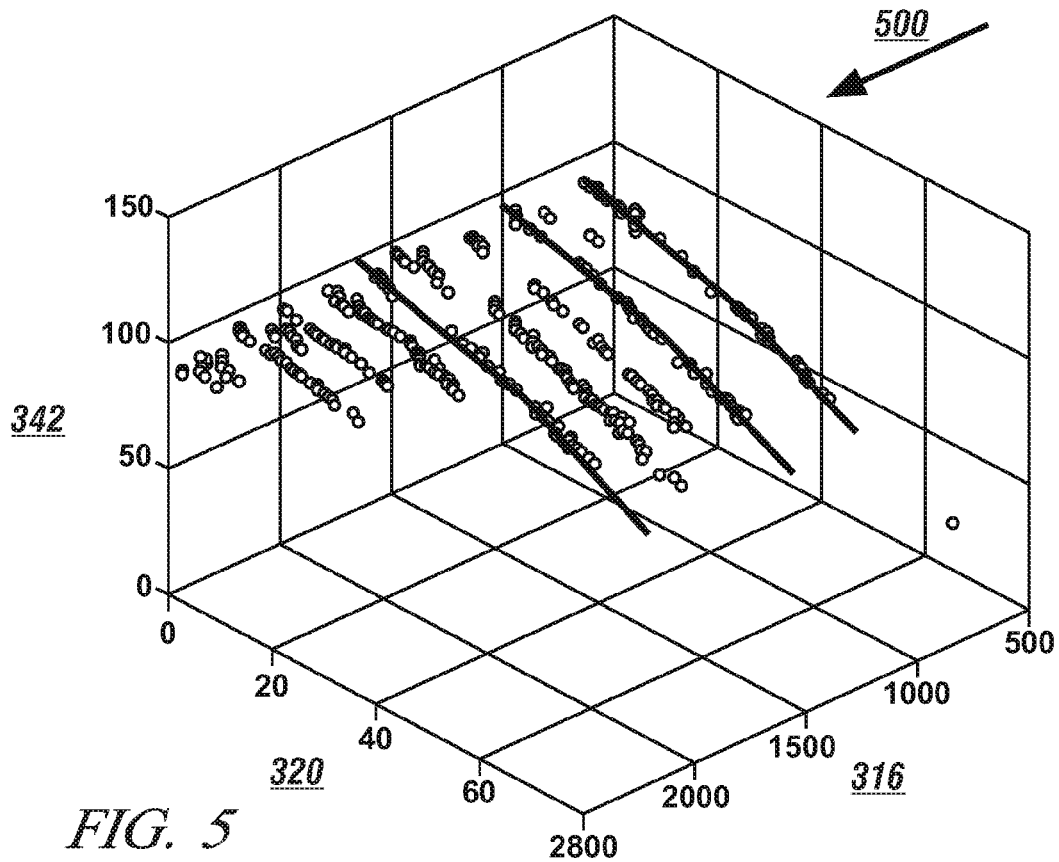
FIG. 5 graphically shows a first initial volumetric efficiency corresponding to a proportion of an intake air charge that is recirculated exhaust gas and engine speed in accordance with the present disclosure.

FIG. 5 graphically shows a calibration 500 depicting a plurality of states of the first volumetric efficiency $\bar{\eta}_v(a)$ 342 that correspond to the engine speed $x_3$ 316 and the proportion of the intake air charge that is recirculated exhaust gas, i.e., EGR % 320 when the EGR valve is open, also represented in the relationship below:

$$\bar{\eta}_v(a)=g(x_3,\text{EGR \%}) \quad [12]$$

wherein Eqs. 8-11 are used to calculate the proportion of the intake air charge that is recirculated exhaust gas, i.e., EGR % 320.

Figure 6:
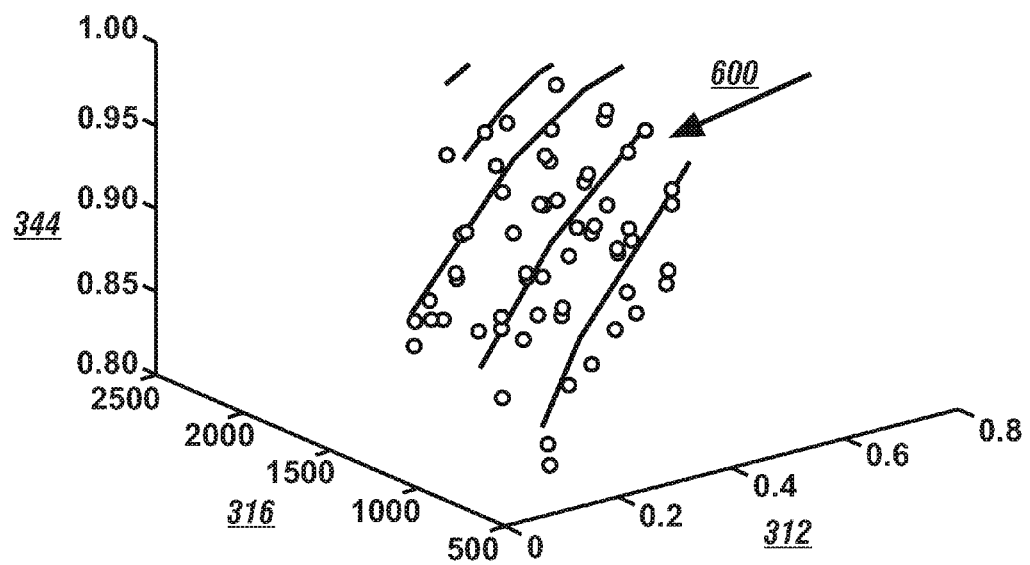
FIG. 6 graphically shows a second initial volumetric efficiency corresponding to the intake air charge density and engine speed when an EGR valve is closed in accordance with the present disclosure.

FIG. 6 graphically shows a calibration 600 depicting a plurality of states of the second volumetric efficiency $\bar{\eta}_v(b)$ 344 that correspond to the intake air charge density $x_1$ 312 and the engine speed $x_3$ 316 when the EGR valve is closed, also represented in the relationship below.

$$\bar{\eta}_v(b)=g(x_1,x_3) \quad [13]$$

The relationships depicted in FIGS. 5 and 6 may be expressed in tabular form as two-dimensional lookup tables in an engine control module.

Figure 4:
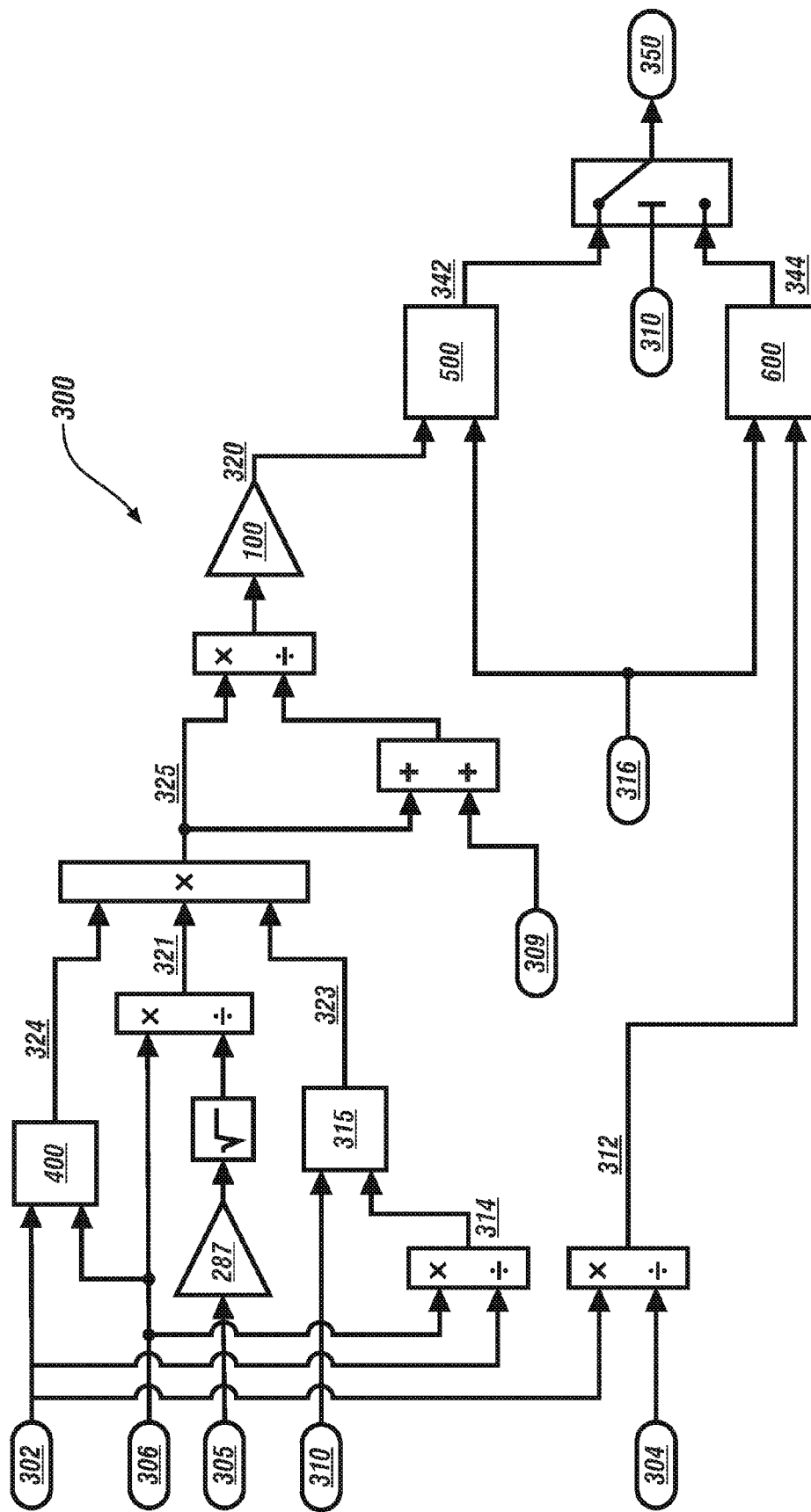
FIG. 4 schematically shows a control scheme for determining volumetric efficiency during ongoing engine operation in accordance with the present disclosure.

FIG. 4 schematically shows a control scheme 300 for determining volumetric efficiency during ongoing engine operation. Engine parameters of interest include intake manifold pressure 302, intake air temperature 304, exhaust manifold pressure 306, exhaust gas temperature 305, engine speed 316, intake air flowrate 309, and EGR valve position 310. The intake manifold pressure 302 and the intake air temperature 304 are combined, as in Eq. 4 above, to determine intake air charge density $x_1$ 312. The intake manifold pressure 302 and the exhaust manifold pressure 306 are combined, as in Eq. 5 above, to determine the engine delta pressure $x_2$ 314. The engine speed 316 is the engine speed $x_3$ 316.

The intake air charge density $x_1$ 312 and the engine speed $x_3$ 316 are inputs to a closed-EGR calibration 600 to select or otherwise determine a closed-EGR valve volumetric efficiency $\bar{\eta}_v(b)$ 344, wherein the closed-EGR calibration 600 is an algorithmic implementation of the relationship depicted in FIG. 6 in either tabular form or as an executable formula. When the EGR valve position 310 indicates the engine is presently operating in a closed EGR valve condition, the closed-EGR valve volumetric efficiency $\bar{\eta}_v(b)$ 344 is selected as a preferred volumetric efficiency 350 for calculating a cylinder air charge, e.g., using Eq. 2 described herein.

Coincidentally, the intake manifold pressure 302, exhaust manifold pressure 306, exhaust gas temperature 305, and EGR valve position 310 are inputs to a control scheme that calculates an EGR flowrate 320 using algorithmic code that reduces Eqs. 8 and 9 to executable code. A control scheme 400 includes Eqs. 10 and 11 in executable form, and operates to calculate the pressure ratio correction term $\psi_{PR}$ 324 using the intake manifold pressure 302 and the exhaust manifold pressure 306. The exhaust manifold pressure 306 and exhaust gas temperature 305 are used to calculate the $$\frac{P_x}{\sqrt{RT_x}}$$

term 321, with element 287 being a gain factor that is used to convert the exhaust gas temperature 305 to Kelvin scale that is multiplied by the gas constant R. The EGR valve position 310 and the engine delta pressure $x_2$ 314 are used to determine the effective flow area of the EGR valve $A_{egr}$ 323, preferably using a predetermined effective area lookup table 315 or another suitable method to determine an effective flow area of the EGR valve $A_{egr}$ 323 corresponding to the EGR valve position 310 and the engine delta pressure $x_2$ 314.

These terms are arithmetically combined to calculate the EGR flowrate $W_{egr}$ 325. The EGR flowrate $W_{egr}$ 325 is combined with the intake air flowrate 309 using Eq. 8 and multiplied by a suitable gain factor 100 to calculate the proportion of the intake air charge that is recirculated exhaust gas, i.e., EGR % 320. The EGR % 320 and the engine speed 316 are inputs to an open-EGR valve calibration 500 to determine an open EGR valve volumetric efficiency $\bar{\eta}_v(a)$ 342, wherein the open-EGR valve calibration 500 is an algorithmic implementation of the relationship depicted in FIG. 5 in either tabular form or as an executable formula.

When the EGR valve position 310 indicates the engine is presently operating in with the EGR valve commanded open, the open-EGR valve volumetric efficiency $\bar{\eta}_v(a)$ 342 is selected as a preferred volumetric efficiency 350 for calculating the cylinder air charge, e.g., using Eq. 2 described herein.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms including control scheme 300, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 7:
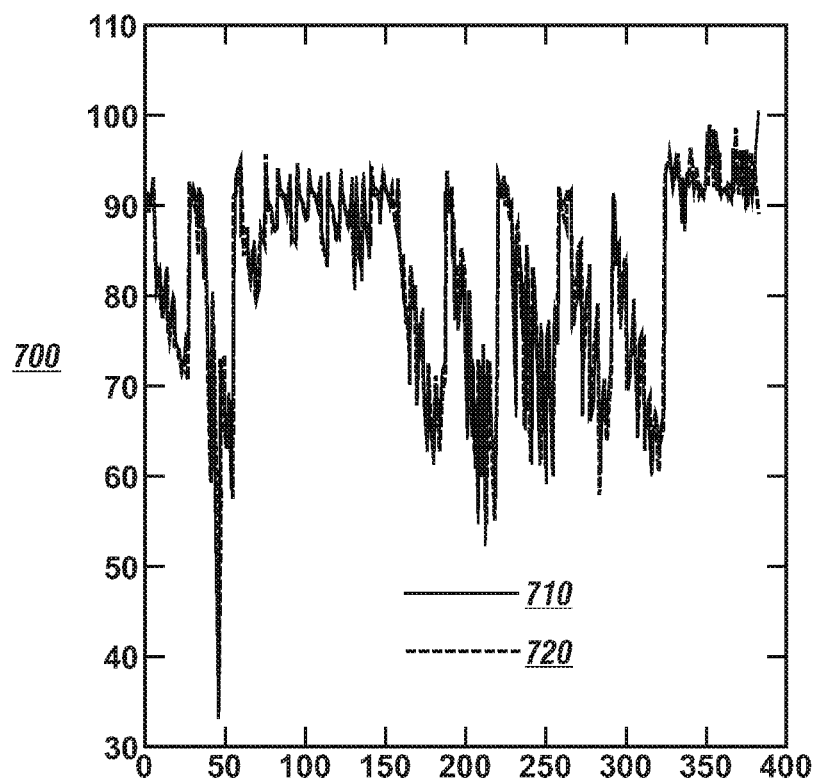
FIG. 7 graphically shows a comparison between an estimated volumetric efficiency and an actual volumetric efficiency in accordance with the present disclosure.

FIG. 7 graphically shows volumetric efficiency on the y-axis 700 as a function of time on the x-axis, and depicts a comparison between an estimated volumetric efficiency 710 and actual volumetric efficiency 720 during ongoing operation of an exemplary engine using the control system described in FIG. 4.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for estimating a cylinder air charge for an internal combustion engine, comprising:

determining a first volumetric efficiency corresponding to engine operation with an open exhaust gas recirculation valve;

determining a second volumetric efficiency corresponding to engine operation with a closed exhaust gas recirculation valve; and determining a cylinder air charge using a selected one of the first and second volumetric efficiencies;

wherein determining the first volumetric efficiency comprises:

determining a proportion of an intake air charge that is recirculated exhaust gas; and determining the first volumetric efficiency as a function of an engine speed and the proportion of the intake air charge that is recirculated exhaust gas;

wherein determining the proportion of the intake air charge that is recirculated exhaust gas comprises:

determining an effective flow area of the exhaust gas recirculation valve as a function of a position of the exhaust gas recirculation valve and a ratio of an exhaust manifold pressure to an intake manifold pressure;

determining an exhaust gas recirculation flowrate corresponding to the effective flow area of the exhaust gas recirculation valve; and determining the proportion of the intake air charge as a ratio of the exhaust gas recirculation flowrate to the sum of the exhaust gas recirculation flowrate and an intake air flowrate.

2. The method of claim 1, wherein determining the effective flow area of the exhaust gas recirculation valve comprises referencing a lookup table.

3. The method of claim 1, wherein determining the second volumetric efficiency comprises determining the second volumetric efficiency as a function of an intake air charge density and an engine speed.

4. The method of claim 3, wherein determining the second volumetric efficiency comprises referencing a lookup table.

5. Method for estimating a cylinder air charge for an internal combustion engine, comprising:

determining a proportion of an intake air charge that is recirculated exhaust gas;

determining a first volumetric efficiency as a function of an engine speed and the proportion of the intake air charge that is recirculated exhaust gas;

determining a second volumetric efficiency as a function of an intake air charge density and the engine speed; and determining a cylinder air charge using a selected one of the first and second volumetric efficiencies;

wherein determining the proportion of the intake air charge that is recirculated exhaust gas comprises:

determining an effective flow area of the exhaust gas recirculation valve as a function of a position of the exhaust gas recirculation valve and a ratio of an exhaust manifold pressure to an intake manifold pressure;

determining an exhaust gas recirculation flowrate corresponding to the effective flow area of the exhaust gas recirculation valve; and determining the proportion of the intake air charge as a ratio of the exhaust gas recirculation flowrate to the sum of the exhaust gas recirculation flowrate and an intake air flowrate.

6. Method for estimating a cylinder air charge for an internal combustion engine, comprising:

determining an effective flow area of an exhaust gas recirculation valve as a function of a position of the exhaust gas recirculation valve and a ratio of an exhaust manifold pressure to an intake manifold pressure;

determining an exhaust gas recirculation flowrate corresponding to the effective flow area of the exhaust gas recirculation valve;

determining a proportion of the intake air charge as a ratio of the exhaust gas recirculation flowrate to the sum of the exhaust gas recirculation flowrate and an intake air flowrate;

determining a first volumetric efficiency as a function of an engine speed and the proportion of the intake air charge that is recirculated exhaust gas;

determining a second volumetric efficiency as a function of an intake air charge density and the engine speed; and determining a cylinder air charge using a selected one of the first and second volumetric efficiencies.

* * * * *